E. V. BOILER.
LIQUID GAGE.
APPLICATION FILED JAN. 15, 1920.
1,375,274.
Patented Apr. 19, 1921.
2 SHEETS—SHEET 1.
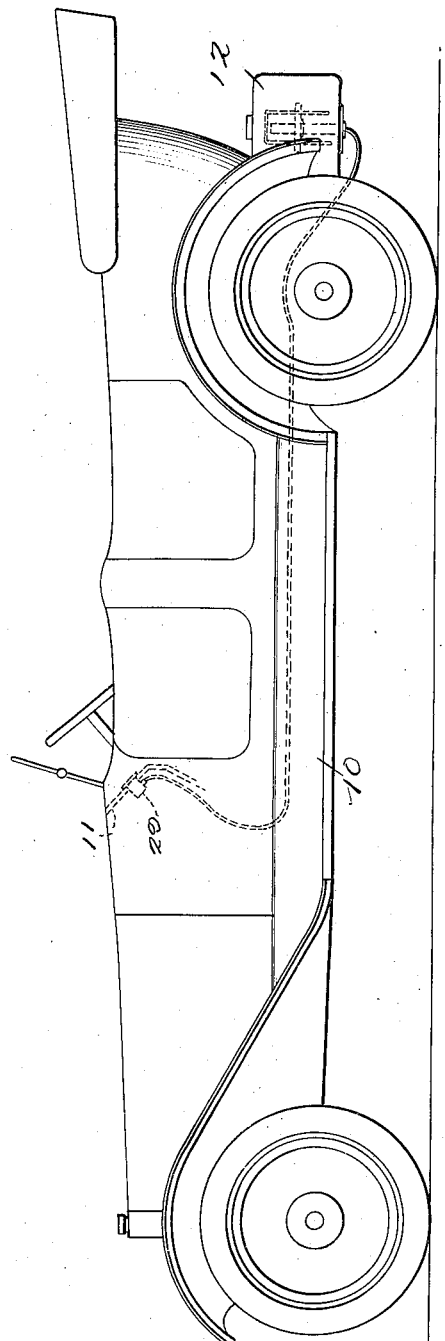
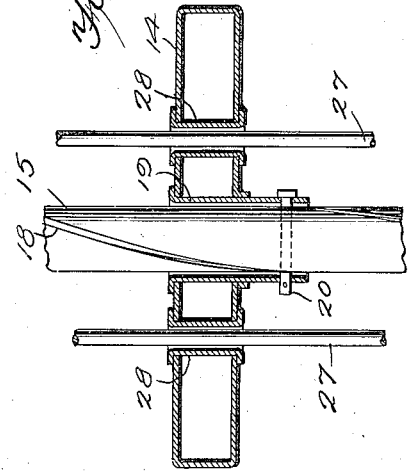
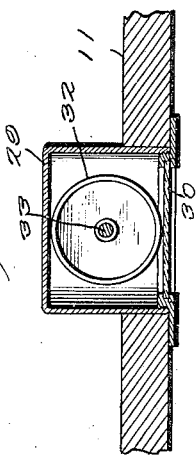
INVENTOR
E. V. Boiler,
BY
ATTORNEYS

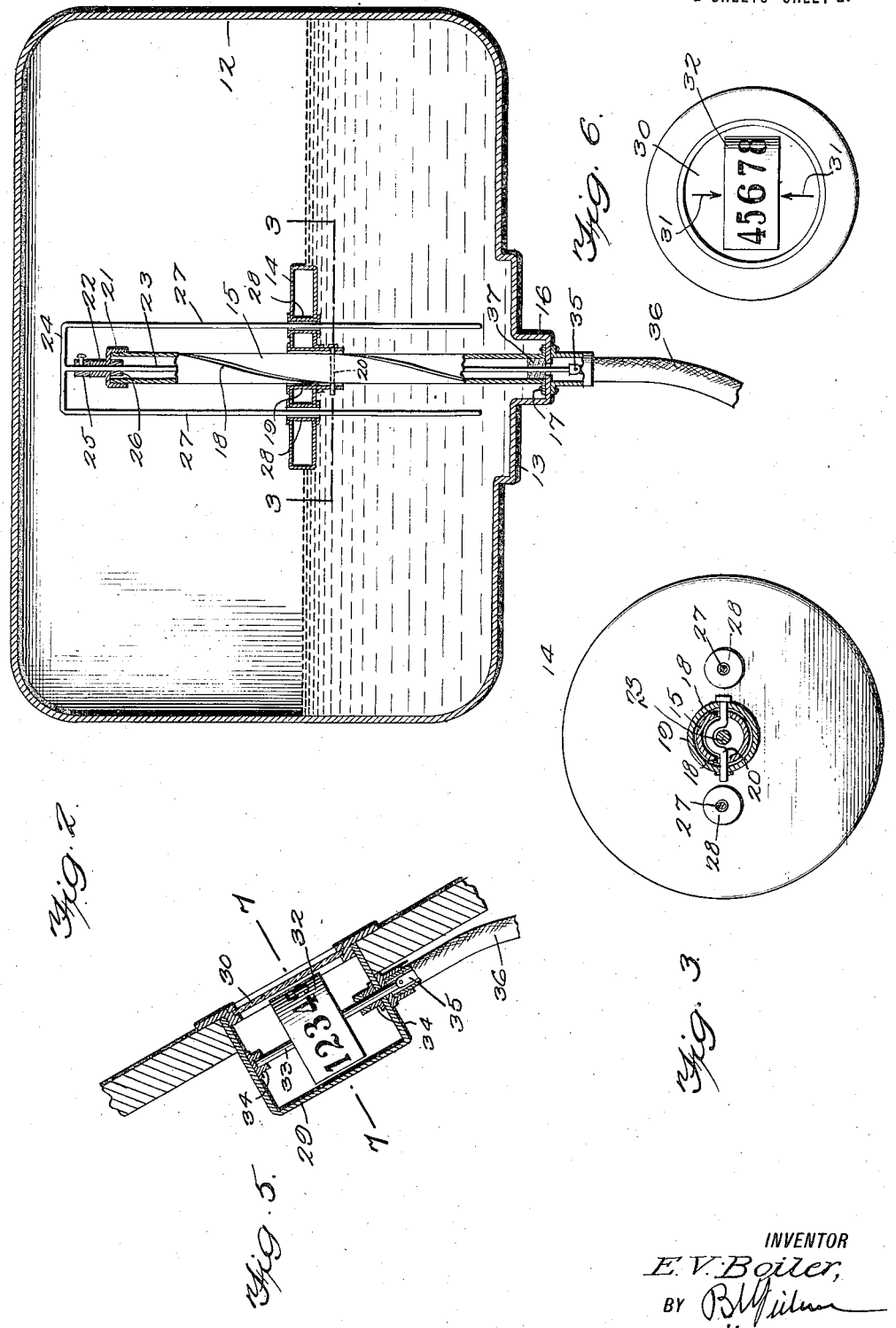

UNITED STATES PATENT OFFICE.

EDWARD V. BOILER, OF WESTSIDE, IOWA.

LIQUID-GAGE.

1,375,274.          Specification of Letters Patent.   Patented Apr. 19, 1921.

Application filed January 15, 1920. Serial No. 351,571.

*To all whom it may concern:*

Be it known that I, EDWARD V. BOILER, a citizen of the United States, residing at Westside, in the county of Crawford and State of Iowa, have invented certain new and useful Improvements in Liquid-Gages, of which the following is a specification.

My invention relates to improvements in liquid gages, adapted for use in connection with automobiles, aeroplanes or the like.

An important object of the invention is to provide means whereby the rise and fall of a float in a liquid holding tank, may be employed to actuate a rotary indicator, arranged at a point remote from the tank.

A further object of the invention is to provide reliable and simple means for causing a vertically movable float, to operate a rotary shaft or element, while being under pressure.

A further object of the invention is to provide a device of the above mentioned character, which is simple in construction, strong and durable.

Other objects and advantages of the invention will be apparent during the course of the following description.

In the accompanying drawings forming a part of this specification, and in which like numerals are employed to designate like parts throughout the same, Figure 1 is a side elevation of an automobile, having my device applied thereto, Fig. 2 is a vertical transverse section through the liquid holding tank, parts being in elevation, Fig. 3 is a horizontal section taken on line 3—3 of Fig. 2, Fig. 4 is an enlarged sectional view through the float, associated elements being in elevation, Fig. 5 is a vertical section through the gage member, parts in elevation, Fig. 6 is a face view of the gage member, and, Fig. 7 is a transverse section taken on line 7—7 of Fig. 5.

In the drawings, wherein for the purpose of illustration is shown a preferred embodiment of my invention, the numeral 10 designates an automobile, having a dash 11, and a gasolene tank 12, at the rear end thereof. I will illustrate my invention in connection with the gasolene tank 12, but it may be used in connection with any form of liquid holding tank, carried by an automobile, aeroplane or the like.

As more clearly shown in Fig. 2, the liquid holding tank 12 preferably has a depressed portion 13, for the reception of a vertically movable float 14, when in the lowermost position.

The numeral 15 designates a vertical actuating tube, which is stationary, and has its lower end preferably arranged in a chamber 16, and bolted or otherwise secured in place therein, as shown at 17. The stationary actuating tube 15, as more clearly shown in Fig. 3, is provided with a pair of spiral slots 18, extending longitudinally thereof. Corresponding portions of these slots are diametrically oppositely arranged, and the slots are pitched in opposite directions, as shown.

The float 14 is preferably of hollow sheet metal construction, while it may be of any other suitable design. This boat is provided centrally thereof with a sleeve 19, rigidly secured to the same, and projecting therebelow, for receiving a transverse pin or element 20, extending through apertures therein. This pin operates within the spiral slots 18, and imparts a rotary movement to the float, as it rises or falls with the level of the liquid.

Secured to the upper end of the tube 15 is a cap 21, having a collar 22, rotatably receiving a drive shaft 23, extending longitudinally through the actuating tube 15, as shown. A cross-head 24 is rigidly secured to the upper end of the drive shaft 23. Sleeves 25 and 26, are rigidly secured to the drive shaft 23, above and below the collar 22, and prevent the longitudinal displacement of the drive shaft.

A pair of depending arms 27 are rigidly secured to the ends of the cross-head 24, and extend exteriorly of the actuating tube 15, in parallel relation thereto. These arms are slidably mounted within sleeves or thimbles 28, formed within or carried by the float 14, at diametrically opposite points.

The numeral 29 designates the casing of the gage member, which is suitably secured to the dash 12, or other desired point remote from the tank 12. The front face of the casing 29 is covered by a transparent dial 30, having pointers 31, coöperating with a rotatable indicator 32, carried by a shaft 33, journaled in bearings 34. The shaft 33 receives its rotation from a flexible shaft 35, connected therewith, and with the lower end of the drive shaft 23, this flexible shaft being inclosed in a housing 36.

The liquid within the tank 12 may be prevented from entering the housing 36, by packing 37, or the like, in the lower end of the tube 15. From the tank 12 to the indicator 29, there is in effect one continuous air tight passage, causing the dial 32 to be in an air tight conduit, so that the complete gage can be operated under pressure.

The operation of the device is as follows: As the level of the liquid in the tank 12 varies, the float 14 rises and falls, as the case may be, and in so doing it is turned by the pin 20 operating within the spiral slots 18. The rotation of the float is imparted to the arms 27, which rotates the drive shaft 23. While the float 14 rotates with the arms 27, it slides longitudinally of these arms, in either direction. The drive shaft turns the flexible shaft 35, which drives the rotatable indicator 32.

It is to be understood that the form of my invention herewith shown and described is to be taken as a preferred embodiment of the same, and that various changes in the shape, size, and arrangement of parts may be resorted to without departing from the spirit of my invention, or the scope of the subjoined claims.

Having thus described my invention, I claim:

1. In apparatus of the character described, a liquid holding tank, a substantially vertical stationary tube arranged within the tank and having a spiral guide means, a vertically movable float arranged within the tank exteriorly of the stationary tube and having a central opening to receive the tube and transverse openings arranged outwardly of the central opening, an element secured to the float and engaging the spiral guide means, an inverted approximately U-shaped member having its arms operating within the outer openings of the float, a drive shaft rotatable within the tube and connected with the inverted approximately U-shaped member, and an indicator connected with the drive shaft to be moved thereby.

2. In apparatus of the character described, a liquid holding tank, a substantially vertical stationary actuating tube arranged within the tank and having a longitudinally extending spiral slot, a float arranged exteriorly of and having an opening to receive the tube, an element carried by the float and engaging within the spiral slot, a rotatable drive shaft extending longitudinally within and through the stationary tube, an arm connected with the upper end of the drive shaft and depending therefrom exteriorly of the stationary tube and so slidably engaging the float as to be turned thereby, and a rotatable indicator connected with the drive shaft.

3. In apparatus of the character described, a liquid holding tank, a substantially vertical stationary actuating tube arranged within the tank and having longitudinal spiral slots, a float arranged exteriorly of the stationary tube and having a sleeve to slidably receive the stationary actuating tube and thimbles arranged outwardly of the sleeve, a pin carried by the sleeve and extending through the slots, a rotatable drive shaft extending within and through the stationary tube, a cross-head carried by the upper end of the drive shaft, depending arms carried by the cross-head and arranged exteriorly of the stationary tube and slidable within the thimbles, a rotatable indicator, and means connecting the indicator and the drive shaft.

In testimony whereof I affix my signature in presence of two witnesses.

EDWARD V. BOILER.

Witnesses:
CLEMENT J. WELCH,
ANDREW BELL, Jr.